US006923233B1

(12) United States Patent
Girault et al.

(10) Patent No.: US 6,923,233 B1
(45) Date of Patent: Aug. 2, 2005

(54) RUNFLAT TIRE WITH SAWTOOTH SHAPED INSERT

(75) Inventors: Jean-Marie Girault, Lasne (BE); Percy Anthony Lemaire, Arlon (BE); Roland Andre Terver, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/088,198

(22) PCT Filed: Sep. 30, 1999

(86) PCT No.: PCT/US99/22779

§ 371 (c)(1),
(2), (4) Date: Jun. 20, 2002

(87) PCT Pub. No.: WO01/25032

PCT Pub. Date: Apr. 12, 2001

(51) Int. Cl.[7] .................. B60C 17/00; B60C 17/04; B60C 17/08
(52) U.S. Cl. .................. 152/516; 152/517; 152/522; 152/155; 152/196
(58) Field of Search .................. 152/516, 517, 152/155, 157, 158, 165, 195, 196, 197, 203, 152/204, 555, 522

(56) References Cited

U.S. PATENT DOCUMENTS 3,782,440 A  1/1974  Depmeyer
4,059,138 A  11/1977  Mirtain et al.
4,111,249 A  9/1978  Markow
4,405,007 A * 9/1983  Welter .................. 152/454
5,368,082 A  11/1994  Oare et al.

FOREIGN PATENT DOCUMENTS

GB       867103       6/1958
JP       4-334603   * 11/1992
WO     WO00/01543    1/2000

OTHER PUBLICATIONS

"Mechanics of Pneumatic Tires", United Sates Department of Commerce, Samuel Clark ed., 1971.*
Patent Abstracts of Japan vol. 015, No. 290, Jul. 1991.

* cited by examiner

Primary Examiner—Jeff H. Aftergut
Assistant Examiner—Justin Fischer
(74) Attorney, Agent, or Firm—Howard M. Cohn

(57) ABSTRACT

A runflat radial ply tire (70) having a thread (72), a carcass (86) and a belt structure (74) radially located between the thread and the carcass has two sidewalls (80, 82) each reinforced with a circumferentially disposed wedge insert (50a', 50b') having a saw-tooth cross-sectional shape. The saw-tooth cross-sectional shape of each wedge insert (50a', 50b') is defined by a plurality of circumferentially disposed segments (52a–52e), each of which is separated from adjacent segments by circumferentially disposed grooves (54a–54d). During heavy loading of the tire, or during runflat operation, the radially loaded sidewall portions deform until the grooves (54a'–54d') undergo closure.

14 Claims, 5 Drawing Sheets

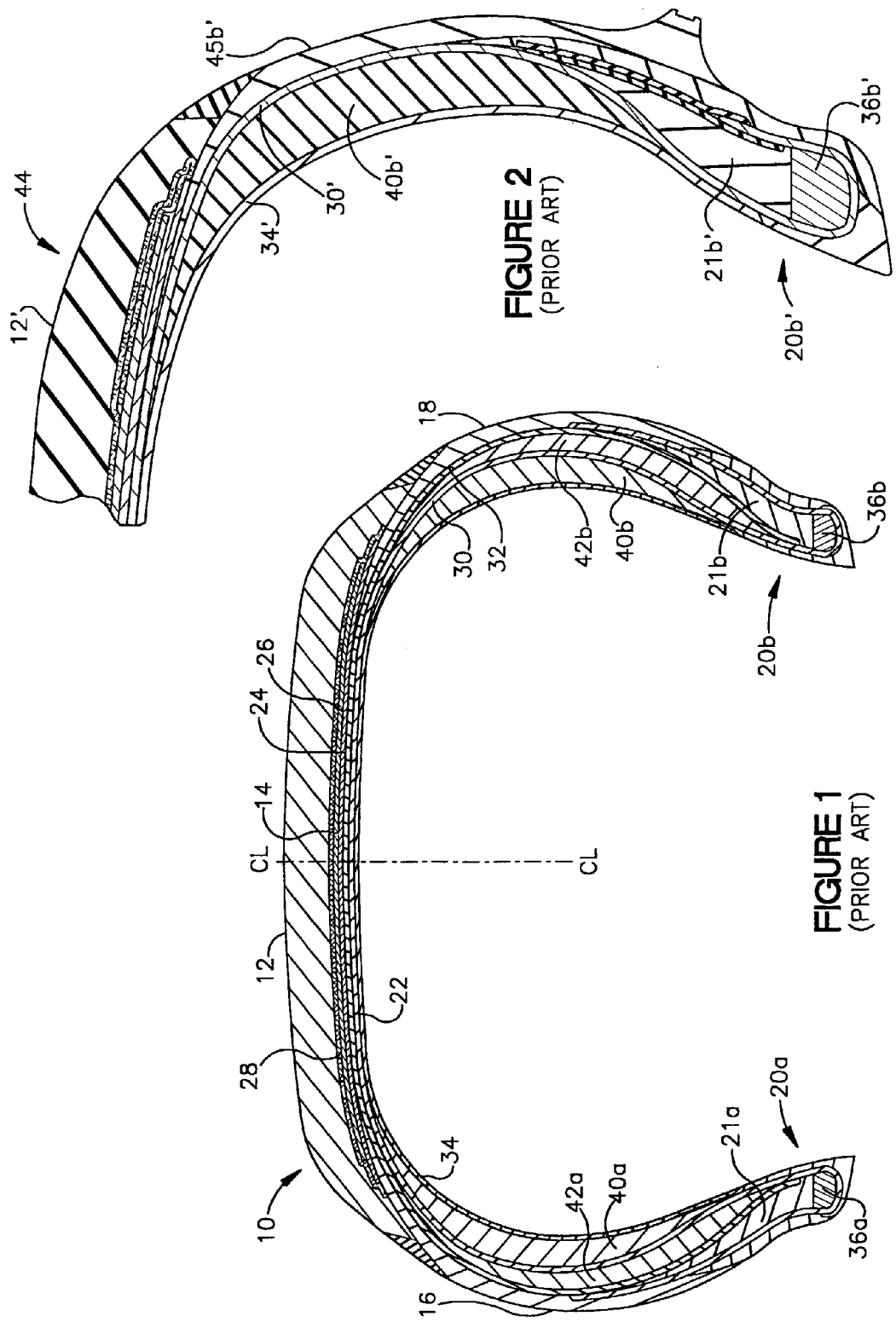

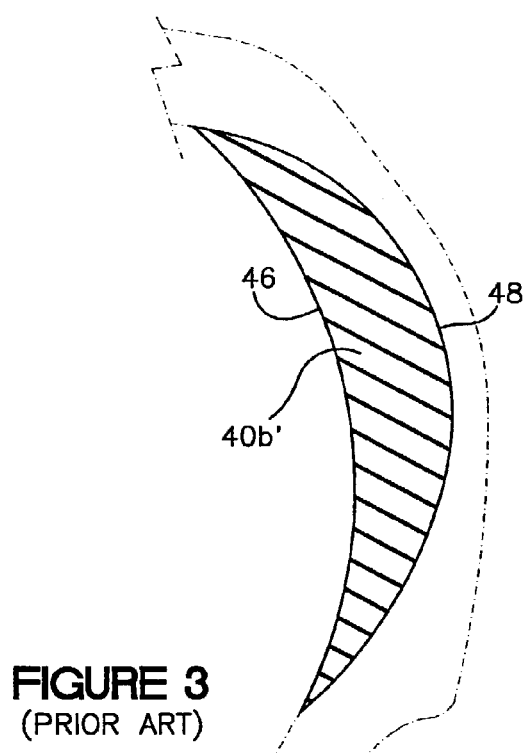
FIGURE 3
(PRIOR ART)
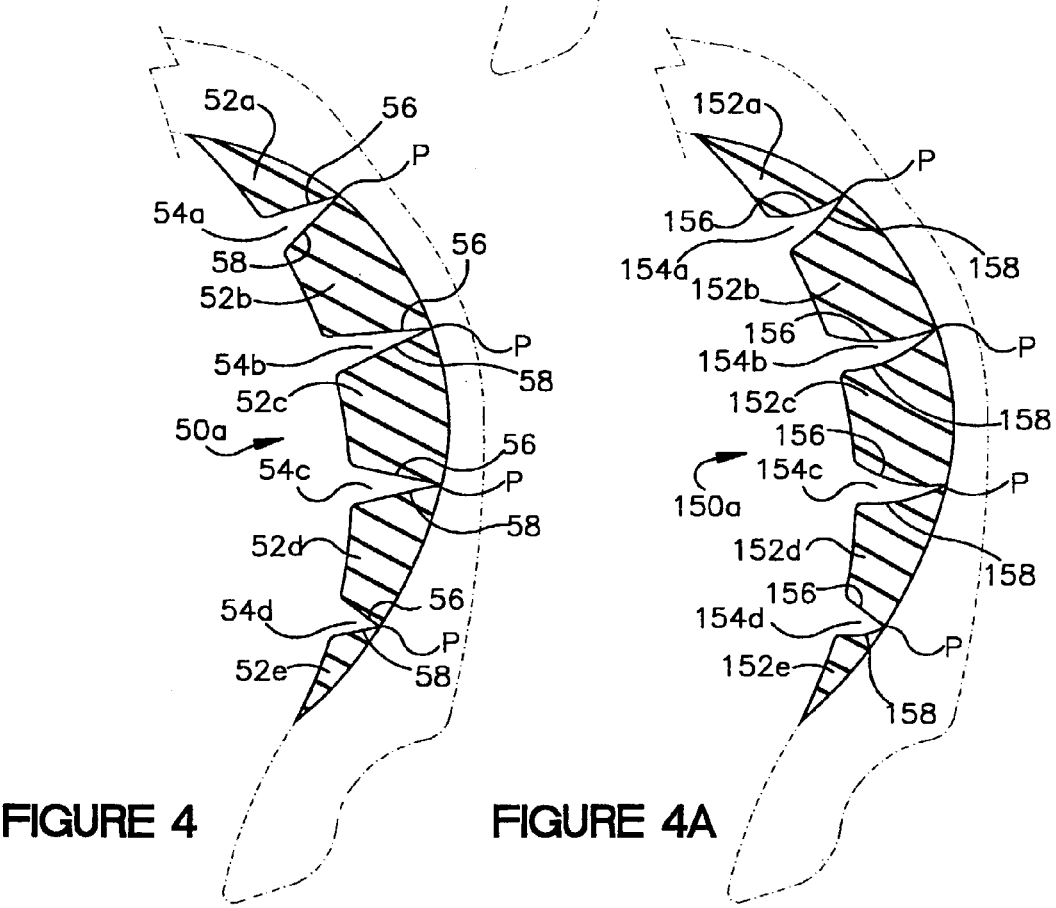
FIGURE 4  FIGURE 4A

RUNFLAT TIRE WITH SAWTOOTH SHAPED INSERT

TECHNICAL FIELD

This invention relates to pneumatic radial-ply runflat tires and in particular to runflat tire construction wherein a sidewall insert design allows for sidewall flexibility under normal-inflated operating conditions yet provides high rigidity under uninflated operating conditions.

BACKGROUND OF THE INVENTION

Various methods have been devised for enabling the safe continued operation of unpressurized or underpressurized tires without damaging the tire further and without causing poor steering and vehicle handling, over a distance from the place where the tire lost its pressure to a place desired by the driver, such as a service station where the tire can be repaired or changed. Loss of tire pressure can result from a variety of causes such as puncture of the tire by a foreign object such as a nail or other sharp object piercing the pneumatic tire installed on a vehicle.

Pneumatic tires designed for continued operation under conditions of loss of pressurization or underpressuration are referred to as extended mobility technology tires or EMT tires. They are also called runflat tires. EMT or runflat tires are designed to be driven in the uninflated condition, whereas the conventional pneumatic tire collapses upon itself when subjected to a vehicle load while uninflated. The sidewalls and internal surfaces of EMTs do not collapse or buckle onto themselves. In general, the terms "EMT" and "runflat" mean that the tire structure alone has sufficient strength to support the vehicle load when the tire is operated in the uninflated state. In particular, the sidewalls are reinforced to carry the tire's load without recourse to the use of other supporting structures of devices that are disposed internal to but separate from the tire. An example of the latter internal supporting structure is shown in U.S. Pat. No. 4,059,138, entitled "Run-flat Tire and Hub Therefor."

Numerous other methods and tire construction have been used to achieve workable runflat tire designs. For example, a runflat tire structural design described in U.S. Pat. No. 4,111,249, entitled the "Banded Tire," shows the use of a hoop or annular band approximately as wide as the tread placed under the tread. The hoop in combination with the rest of the tire structure could support the vehicle weight in the uninflated condition.

Generally, runflat tires incorporate reinforced sidewall designs of the type mentioned before. Such sidewalls are thicker and stiffer, so that the tire's load can be carried by an uninflated tire without compromising vehicle handling until such reasonable time as the tire can be repaired or replaced. The methods of sidewall stiffening include the incorporation of inserts or fillers generally having, in cross-sectional view, a crescent shape. Such inserts, or wedge inserts as they are often called, are located in the inner peripheral surface of the sidewall portion of the carcass, which is the region in the tire usually having the lowest rigidity. In such runflat or EMT designs, the entire sidewall has an approximately uniform thickness corresponding to the thickness of the bead region, so as to provide runflat supporting rigidity. The sidewalls of such tires, when operated in the uninflated condition, experience a net compressive load, though the outer portions of the sidewalls are necessarily in tension due to the bending stresses while the insides are correspondingly in compression, especially in the regions of the sidewall that are in the midway point between the tire's bead region and that portion of the tread that is most immediately adjacent to the ground-contacting portion of the tread.

Due to the large amounts of rubber required to stiffen and reinforce the sidewalls, heat buildup as a result of cyclical flexure of the sidewalls is a major factor in tire failure, especially when the uninflated tire is operated for prolonged periods of time and at high speeds. During normal-inflated operation, the hysteresis of the material of the thickened sidewalls contributes to the tire's rolling resistance, which reduces the vehicles fuel mileage. The additional weight of the wedge insert reinforcements also presents a challenge to the designer of runflat tires.

U.S. Pat. No. 5,368,082 ('082), having a common assignee with the present invention, disclosed the first commercially accepted runflat pneumatic radial ply tire. The '082 patent describes the employment of sidewall wedge-insert reinforcements to improve stiffness. Approximately six additional pounds of weight per tire was required to support an 800 lb load in this uninflated tire. This earlier invention, although superior to prior attempts at runflat tire design, still imposed a weight penalty that could, however, be offset by the elimination of a spare tire and the tire jack. However, this weight penalty was even more problematic when the engineers attempted to build high-aspect-ratio tires for large, heavy vehicles, such as touring sedans. The required supported weight for an uninflated luxury car tire can exceed 1,000 lbs. These taller sidewalled tires, having aspect ratios in the 55% to 65% range or greater, means that the sidewall bending stresses are several times that of the earlier low-aspect-ratio runflat tires. The ability to handle such loads meant that the sidewalls and overall tire had to be stiffened to the point of adversely influencing riding comfort and some handling characteristics. Accordingly, EMT or runflat tire design requires that there be no loss in riding comfort or vehicle handling. In the very stiff suspension performance type vehicle, such as sports cars and various sport/utility vehicles, the ability to provide such runflat tires was relatively straightforward compared to providing similar runflat tires for luxury sedans which require a softer ride. Light truck and sport utility vehicles, although not as sensitive to ride performance, provide a runflat tire market that ranges from accepting a stiffer ride to demanding the softer luxury type ride.

Thus the EMT or runflat tire designs incorporating sidewall wedge-insert reinforcements of the sort described in the '082 patent add weight to the tire while also causing flexural heat buildup in the wedge insert material, especially during runflat operation when the magnitude of the cyclical sidewall flexure is greatest. And, as mentioned, normal-inflated riding comfort is also compromised by the additional sidewall stiffness, and the tire's rolling resistance is greater than that of corresponding non-runflat designs. Thus the design goals of EMT or runflat tire designers are to minimize tire weight, minimize the potential for heat buildup during runflat operation (especially at high speed), and, during normal-inflated operation, give minimum rolling resistance, good riding comfort and acceptable handling characteristics.

A tire's service life is dominated, of course, by full-inflated operation. Therefore, the main or most immediate above-listed design goals are good riding comfort and low rolling resistance, with tire weight being of secondary importance to the extent that it should not adversely affect the performance of sports-type vehicles. As for heat buildup, it is mostly a problem during runflat operation, being a major contributing factor to the inevitable deterioration of the tire when operated without inflation.

Another example of an EMT or runflat tire design that at least part achieves the same riding-comfort problem while also addressing the tire weight problem is covered in Patent Application Serial No. PCT/US98/13929, entitled IMPROVED SIDEWALL WITH INSERT CONSTRUCTION FOR RUNFLAT TIRE, and having a common assignee with the present invention. In this invention, a metal-reinforced first ply carries a major part of the compressive load during runflat operation, which allows the thickness of the wedge-insert reinforcements to be less than otherwise would be needed. That metal-reinforced first ply experiences primarily tensile loading during normal-inflated operation, and otherwise provides improved sidewall flexibility during normal inflated operation. During runflat operation, however, the metal members of the first ply undergo substantial compressive loading, especially in the sidewall portions that are most immediately adjacent to the ground-contacting portion of the tread. The tire of the invention described by the PCT/US98/13929 application thus addresses the design goals of full-inflated riding comfort, tire weight and extended runflat service life.

Another example of a tire designed to be usable without normal inflation pressure is found in Great Britain Patent Specification No. 867,103, published May 3, 1961, which discloses a tire having a stiffener made of rubber and attached to the inside of each sidewall. The stiffener extends circumferentially, continuously all the way round the sidewall of the tire, and extends radially from a point near the radially inner extremity of the tire to a point near the center of the tread. The stiffener is divided into individual circumferential ribs, separated from each other by wedge-shaped gaps.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire having one or more wedge inserts in each sidewall, the axially innermost or first wedge insert providing to each sidewall a minimal reinforcing rigidity during full-inflated operation and maximum reinforcing rigidity during runflat operation, thereby providing improved riding comfort and handling characteristics during normal-inflated operation as well as rigid structural support during runflat operation.

Another object of the present invention is to provide a runflat radial tire that contains sidewall-reinforcing wedge inserts that are light in weight and which contribute minimal excess rolling resistance during normal-inflated operation.

Yet another object of the present invention is to provide a runflat tire having a reduced heat generating potential during both normal inflated, high-speed operation and during runflat operation.

Still another object of the present invention is to provide a tire having an increased runflat operational service life and improved handling characteristics.

And yet another object of the present invention is to apply the inventive concept to a variety of alternative carcass constructions, as described herein.

SUMMARY OF THE INVENTION

The present invention relates to a pneumatic radial ply runflat tire having a tread, a carcass comprising a radial ply structure, a belt structure located between the tread and the radial ply structure, an innerliner and two sidewalls each reinforced by one or more wedge inserts. The first or axially inwardmost of the sidewalls has a structural moment of inertia that increases with bending strain due to a design having a saw-tooth shape in cross-sectional view. The saw-tooth shape is defined by a plurality circumferentially disposed segments each of which is separated from each adjacent segment by a circumferential groove. Each circumferential groove has a radially outwardmost surface which, when the runflat tire is operated in a non-inflated mode, engages a radially inwardmost surface of the groove. The respective radially outwardmost surface and the corresponding radially inwardmost surface of each groove can be flat or non-flat. The respective radially outwardmost surface and the corresponding radially inwardmost surface of each groove converge at the axially inwardmost side of each saw-tooth shaped wedge insert. The point of convergence of each circumferentially disposed groove separating each set of two wedge-insert segments constitutes a hinge point about which the respective circumferentially disposed segments can pivot into contact during runflat operation.

Other benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein:

FIG. 1 is a cross-sectional view of a prior art runflat tire design incorporating multiple wedge inserts in each sidewall and multiple plies in the ply structure;

FIG. 2 is a fragmentary cross-sectional view of one side of a prior art runflat tire design having a single wedge insert in each sidewall;

FIG. 3 is a schematic fragmentary cross-sectional view of a prior art sidewall-reinforcing wedge insert;

FIG. 4 is a schematic fragmentary cross-sectional view of a first embodiment of a sidewall-reinforcing wedge insert according to the present invention;

FIG. 4A is a schematic fragmentary cross-sectional view of a second embodiment of a sidewall-reinforcing wedge insert according to the present invention;

DEFINITIONS

Figure 4B:
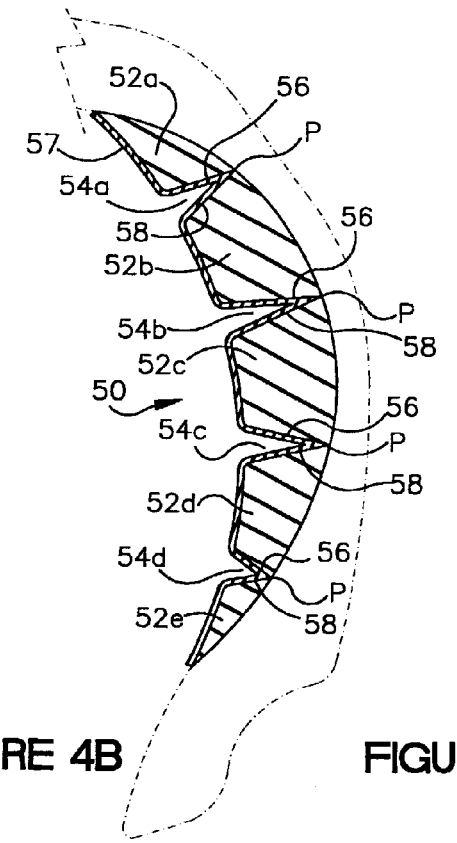
FIG. 4B is a schematic fragmentary view of the first embodiment of the sidewall-reinforcing wedge insert with an inner liner.

"Apex" means an elastomeric filler located radially above the bead core and between the plies and the turnup plies.

"Aspect ratio" means the ratio of the section height of a tire to its section width; also refers to the cross-sectional profile of the tire; a low-profile tire, for example, has a low aspect ratio.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt structure" or "reinforcement belts" or "belt package" means at least two annular layers or plies of parallel cords, woven or unwoven, underlying the tread, unanchored to the bead, and having both left and right cord angles in the range from 18° to 30° relative to the equatorial plane of the tire.

"Breakers" or "tire breakers" means the same as belt or belt structure or reinforcement belts.

"Carcass" means the tire structure apart from the belt structure, the tread, the undertread and sidewall rubber over the plies, but including the beads.

"Casing" means the carcass, belt structure, beads, sidewalls and all other components of the tire excepting the tread and the undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "tire crown" means the tread, tread shoulders and the immediately adjacent portions of the sidewalls.

"Equatorial plane" means the plane perpendicular to the tire's axis of rotation and passing through the center of its tread; or the plane containing the circumferential centerline of the tread.

"EMT tire" means "extended mobility technology tire," which means the same as "runflat tire".

"Footprint" means the contact patch or area of contact of the tire tread with a flat surface at zero speed and under normal load and pressure.

"Gauge" refers to or means the same as thickness.

"Innerliner" means the layer or layers of elastomer or other material that form the inside surface of a tubeless tire and that contain the inflating fluid within the tire.

"Insert" means the same as "wedge insert," which is the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Meridional" refers to the meridian direction of a tire as, for example, a meridional cross-sectional view in which the plane of the cross section contains the tire's axis.

"Moment of inertia" or "structural moment of inertia" refers to the structural rigidity of a beam section or other structure such as, specifically, the sidewall of a tire. A structure, such as a tire sidewall, having a high moment of inertia is more rigid than a similar structure having a lower moment of inertia.

"Normal inflation pressure" means the specific design inflation pressure at a specified load assigned by the appropriate standards organization for the service condition for the tire.

"Normal load" means the load assigned by the appropriate standards organization for the service condition of the tire operated at a specific design inflation pressure.

"Ply" means the same as "carcass ply," which is a cord-reinforced layer of rubber-coated meridionally deployed or otherwise parallel cords.

"Radial" and "radially" mean directions radially toward or away from the axis of rotation of the tire.

"Radial ply structure" means the one or more carcass plies in which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead and are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread cap" refers to the tread and the underlying material into which the tread pattern is molded.

"Tread width" means the arc length of the tread surface in the plane includes the axis of rotation of the tire.

"Wedge insert" means the same as "insert," which is the sidewall reinforcement used in runflat tires.

DETAILED DESCRIPTION OF THE PREFERRED EMBODIMENT

Prior Art Embodiment

With reference to FIG. 1, a cross section of a typical prior art pneumatic radial runflat tire 10 is illustrated. The tire 10 has a tread 12, a belt structure 14 comprising a first or inner belt 24 and a second or outer belt 26, a pair of sidewall portions 16,18, and a carcass structure 22. The carcass 22 comprises a first or inner ply 30 and second or outer ply 32, a gas-impervious innerliner 34 and a pair of bead regions 20a,20b comprising a pair of beads 36a,36b, and a pair of bead filler apexes 21a,21b. The sidewalls 16,18 each contains a first pair of axially inwardmost sidewall wedge inserts 40a,40b, and a second pair of axially outwardmost sidewall wedge inserts 42a,42b. The first or innermost wedge inserts 40a,40b are disposed between the innerliner 34 and the first ply 30, while the second wedge inserts 42a,42b are disposed between the first ply 30 and the second ply 32. A fabric overlay 28 can be deployed beneath, or radially inward of, tread 12 and on top of, or radially outward from, belt structure 14. The respective pairs of wedge inserts 40a,40b,42a,42b in each sidewall portion 16,18, respectively, impart to the sidewalls a greater structural moment of inertia, or rigidity, for resisting the otherwise extreme deformations that, during low or zero inflation pressure, would be imposed upon those parts of the sidewall portions that are most immediately adjacent to the ground-contacting portion of the tread 12. The wedge-insert reinforced sidewall portions 16,18 of carcass structure 22 thus impart to the tire 10 a limited runflat capability.

As can be seen from FIG. 1, the structural reinforcements in the sidewall portions of the tire 10 substantially increase the overall thickness of the sidewall portions 16,18. In fact, the view of this generalized prior art runflat tire 10 demonstrates the more or less uniformly thickened sidewalls 16,18 that characterize runflat tire designs. The insert-reinforced sidewalls 16,18 support the load of the tire 10 with minimal sidewall deflection when the tire is uninflated. Such a runflat tire design generally provides good vehicle handling and performance under conditions of full inflation, and it provides acceptable runflat vehicle handling and an acceptable runflat operational life when the tire is uninflated.

FIG. 2 is a fragmentary cross-sectional view of one sidewall 45b' of a prior art tire 44 that is a variation of the tire 10 of FIG. 1. More specifically, the tire 44 has only one wedge insert 40a',40b' in each sidewall 45a',45b'. Throughout the specification, primed numbers represent structural elements which are substantially identical to structural elements represented by the same unprimed number. (The sidewall insert 40b' of FIG. 2 is the mirror image, with respect to the centerline CL, of the unshown sidewall insert 40a'.) The tire 44 also has a single carcass ply 30', rather than the two carcass plies 30,32 shown in the prior art tire 10 of FIG. 1.

The use of a fragmentary cross-sectional view of a single reinforced sidewall of the sort shown in FIG. 2 will allow a simplified discussion of the dynamics of wedge inserts in the description below of the present invention. FIG. 3 is a schematic view of the prior art, single-wedge-insert-per-sidewall design shown in fragmentary cross-section in FIG. 2. In FIG. 2, the single crescent-shaped wedge insert 40b' is disposed within the sidewall 45b' in the location between the single carcass ply 30' and the innerliner 34'. Correspondingly, in the schematic view shown in FIG. 3, the wedge insert 40b' is also bounded on its concave side 46 by an innerliner 34' (unshown in the schematic view) and, on its convex side 48 by a carcass ply 30' (also not shown in the schematic view). Neither the innerliner 34' nor the carcass ply 30' is immediately relevant to the following discussion and description of the operational dynamics of the innovative "saw tooth" wedge insert design of the present invention.

The views in FIGS. 1, 2 and 3 of the prior art reinforcing wedge insert should make apparent to those skilled in the engineering arts that the prior art wedge inserts 40a,40b, 42a,42b,40a',40b' of the respective prior art tires 10 and 44, in particular the wedge inserts 40b' shown in FIGS. 2 and 3, will necessarily result in a runflat tire whose normal-inflated use will reflect the presence of the reinforced and stiffened sidewalls. That is to say, the ride will be rougher and less comfortable due to the greater sidewall stiffness which, of course, arises from the greater structural moment of inertia, or rigidity, imparted to the sidewall portions by the presence of the reinforcing wedge inserts. The wedge inserts can be constructed of a wide range of elastomeric materials having a Shore A hardness of between 50 and 85. Further, the wedge inserts have a tangent delta in the range of between 0.02 and 0.06 and has a modulus G between 2 Mpa and 8 Mpa (as measured at Metravib at 90° C., 0.2%).

Ideally, the reinforced sidewalls of a runflat tire should be as flexible during normal-inflated operation as those of a corresponding-sized, non-runflat tire while also being rigid during runflat operation. The present invention provides an innovative saw-tooth wedge insert design, discussed in more detail below, that gives stiffness and rigid reinforcement to the sidewalls during runflat operation while maintaining good flexibility during normal-inflated operation. Furthermore, the "saw-tooth" design of the wedge inserts of the present invention provide to the tire designer a means by which to "tune" various runflat tire designs according to the intended final use of the tire. In other words, and as will become evident, the number of grooves, and their shapes and volumes between the "tooth" segments of the wedge insert according to the present invention, will present a design variable that, in combination with the chosen properties of the material from which the wedge insert is made, will afford the tire designer a wide latitude within which to design runflat tires having nearly any desired balance between inflated and runflat performance.

Basic Principle of the Present Invention

The prior art single-wedge-insert-per-sidewall runflat design shown in FIGS. 2 and 3 is particularly relevant to the present invention which also contemplates a single wedge insert in each sidewall. A generalized embodiment of the saw-tooth shaped wedge insert of the present invention is shown in fragmentary schematic cross-section in FIG. 4.

Referring to FIGS. 2 and 3, it should be apparent to those skilled in the engineering arts that the wedge insert 40b' will, when subjected to vertical loading of the sort encountered during normal-inflated operation, but which is especially and most extremely present during runflat operation, deflect in such a way as to increase the concavity of the respective wedge inserts. Accordingly, the axially inwardmost and concave side 46 of the wedge insert shown in FIG. 3 will be subjected to compressive stresses while the axially outwardmost and convex side 48 will experience tensile stresses. The latter tensile stresses will, in fact, be born primarily by the adjacent radial carcass ply structure (not shown in FIG. 3). Such compressive and tensile stresses are, of course, necessarily associated with the sidewall reinforcing properties of the prior art wedge insert 40b' and carcass plies 30', even when the tire 44 (FIG. 2) is fully inflated. In other words, the sidewalls of the prior art runflat tires of the sorts shown in FIGS. 1, 2 and 3 will be rigid during normal inflated operation because the sidewall-reinforcing wedge inserts, whether two inserts are used in each sidewall (FIG. 1) or only one in each sidewall (FIGS. 2 and 3), necessarily make the runflat sidewalls less accommodating of ordinary road surface roughness than would be so for the sidewalls of corresponding non-runflat radial ply tires having a similar aspect ratio.

Referring to FIG. 4, there is shown in fragmentary schematic cross-section, one embodiment of a circumferentially disposed saw-tooth shaped wedge insert 50 built according to the present invention. The saw-tooth wedge insert 50 comprises a plurality of segments 52a,52b,52c,52d,52e (52a–52e) disposed circumferentially within each sidewall-reinforcing wedge insert of a runflat tire incorporating the innovative design of the present invention. Each segment 52a–52e is separated, during normal-inflated operation, from the adjacent segments 52a–52e by intervening circumferential grooves 54a,54b,54c,54d (54a–54d). Each circumferential groove 54a–54d is bounded by a radially outermost flat surface 56 of the radially outermost segment and by a radially innermost flat surface 58 of the radially innermost segment of the adjacent segments on either side of the groove, e.g. groove 54a has segment 52a in the radially outermost side and segment 52b on the radially innermost side. The length of the surfaces 56,58 extend the thickness of the insert or less as desired. Also the point P, while shown as the point of intersection of surfaces 56 and 58, can also have different configurations to reduce stress concentration and/or enhance the pivoting of the two surfaces with respect to each other.

NOTE: The saw-tooth wedge insert of the present is designated by the number 50 when shown singly, or as 50a,50b when shown disposed within each reinforced sidewall of runflat tires depicted in meridional cross-sectional view.

Figure 5:
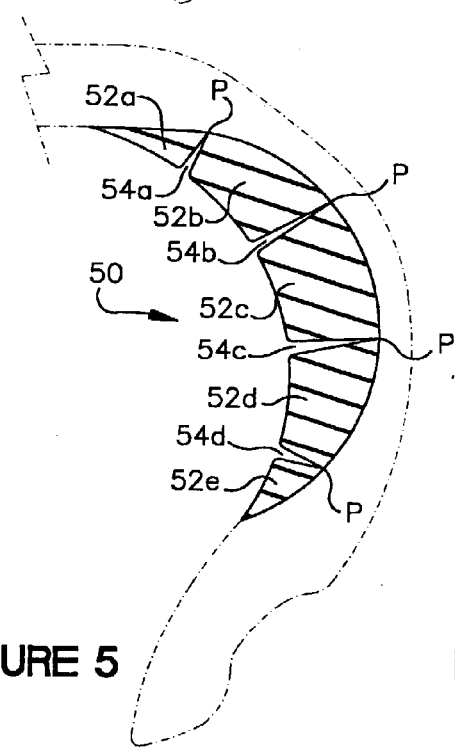
FIG. 5 is a schematic fragmentary cross-sectional view of the first embodiment of a sidewall-reinforcing wedge insert of the present invention partially deflected by radially applied force.

FIG. 5 is a fragmentary cross-sectional schematic view of a partially deformed saw-tooth shaped, sidewall-reinforcing wedge insert 50 when the sidewall of a tire incorporating the invention is subjected loading of the sort that might result when a fully inflated runflat tire encounters a large disparity such as a chuck hole in a driving surface. Under such conditions, the wedge insert 50 will deflect in such a way that the circumferential grooves 54a–54d separating the plurality of circumferential segments 52a–52e become smaller in the radial direction as the segments pivot about the respective hinge points P. That is, as the mutually adjacent segments 52a–52b, 52b–52c, 52c–52d, 52d–52e pivot in relation to one another about the respective points P, the intervening grooves 54a–54d become smaller in cross-sectional area.

Referring to FIG. 4A, there is illustrated an alternative embodiment of the wedge insert 150a of the present invention. Insert 150b not shown but being a mirror image of insert 150a. Specifically, each intervening groove 154a, 154b,154c,154d (154a–154d) is bounded by convex surfaces 156,158 which are respectively shaped such that each radially outermost non-flat surface 156 can, during the most extreme deflection of the wedge insert 150a, engage the corresponding non-flat surface 158 that defines the radially inwardmost surface of each intervening groove 154a–154d between the respectively adjacent segments 152a–152e. This interaction, i.e. between the concave and adjacent convex surfaces, prevents axial deflection in addition to radial deflection of the sidewalls. Though the subsequent FIGS. 6, 7 and 8 of this disclosure show the circumferential grooves 54a–54d to be defined by two flat surfaces 56,58 of adjacent segments 52a–52e converging at the points P, it is the intent of the inventors that the non-flat convex and concave surfaces 156,158 are to be included as variations of the innovative design of wedge inserts 150a according to the present invention. Also, the non-flat surfaces 156,158 are not to be construed as being specifically of the shapes shown in FIG. 4A. Besides being in a reversed order, i.e. the concave surface being the radially outermost surface, other non-flat surfaces might be deemed appropriate for specific tire designs and intended tire usages.

FIG. 4B is substantially identical to FIG. 4 except the inner liner 57 is shown about the inner surface of insert 50.

Figure 4C:
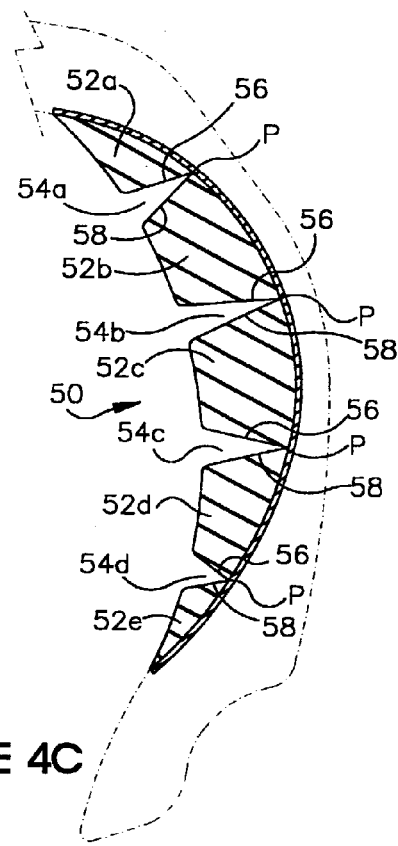
FIG. 4C is a schematic fragmentary view of the first embodiment of the sidewall-reinforcing wedge insert with inner liners between the insert and the first ply.

FIG. 4C is similar to FIG. 4B except the inner liner is shown between the insert 50 and the inner ply 30 (not shown). It is also within the terms of the invention to dispense with the inner liner and form the insert 50 or other part of the carcass with a rubber that holds the air and serves the functions of the inner liner.

Figure 6:
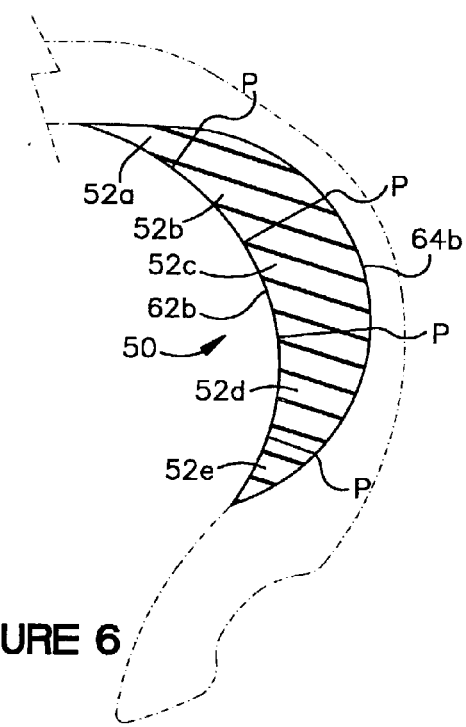
FIG. 6 is a schematic fragmentary cross-sectional view of the first embodiment of a sidewall-reinforcing wedge insert of the present invention fully deflected by radially applied force.

FIGS. 5 and 6 are fragmentary cross-sectional schematic views of the wedge insert 50 according to the present invention when the tire containing such sidewall-reinforcing inserts is operated in the inflated and uninflated condition. More specifically, FIG. 5 shows partial deformation of the sidewall, such as when the tire hits a hole during inflated operation and the grooves 54a–54d become smaller. FIG. 6 shows the extreme deformation of those portions of the sidewalls that are most immediately adjacent to the ground-contacting portions of the tread of an uninflated runflat tire incorporating the present invention. The circumferential grooves 54a–54d, shown to be separating the respectively adjacent circumferential segments 52a–52e of the insert 50 in FIGS. 4 and 5, cease to exist in FIG. 6. In other words, under the conditions of the most extreme sidewall deformation associated with zero inflation pressure and runflat operation, the mutually adjacent segments 52a–52e pivot about the hinge points P until the intervening circumferential grooves undergo complete closure. The closure of the grooves 54a–54d (no longer present in FIG. 6) enables the axially inwardmost concave side 62b of the wedge insert 50a to become a contiguous, compression-load-bearing structure. At the same time, the axially outwardmost convex side 64b of the insert 50a is bounded by one or more radial carcass ply layers of the sort shown as a single carcass ply 88 (compare to 30,30') in FIG. 7, though two or more mutually adjacent carcass ply layers might be used in the location occupied by the carcass ply 88 shown in FIG. 7.

The inventive concept herein described affords to runflat radial ply tire designers an innovative wedge insert sidewall reinforcement which confers upon the thus reinforced sidewalls a low structural moment of inertia during normal-inflated operation and a high structural moment of inertia during runflat operation. In other words, runflat tires incorporating the present invention will provide a soft and comfortable ride, with good vehicle-handling characteristics, during normal-inflated operation, yet will also provide the requisite sidewall rigidity needed for effective and long-lasting runflat service. In addition, the number of circumferential segments 52a–52e, and the sizes and shapes of the intervening circumferential grooves 54a–54d, provide the tire designer with an additional design variable with which to "tune" a given runflat tire design according to the intended final use of the tire. For example, a runflat tire incorporating the present inventive concept might have fewer and smaller intervening grooves 54 in tires designed for light trucks and sport utility vehicles than a tire intended for use in a luxury sedan.

First Embodiment

Figure 7:
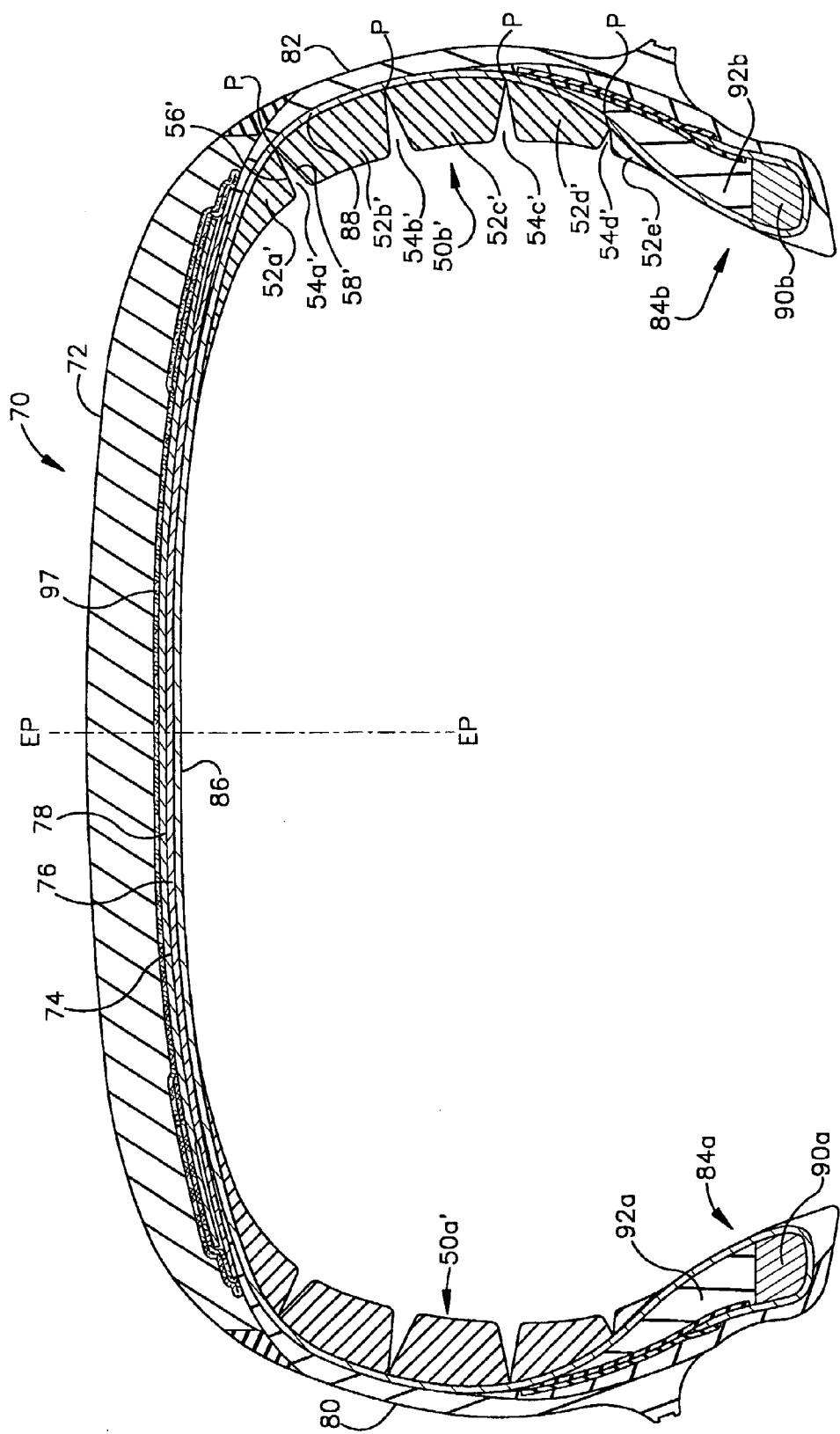
FIG. 7 is a meridional cross-sectional view of a tire incorporating the first embodiment of a sidewall-reinforcing insert in accordance with the present invention.

With reference to FIG. 7, there is illustrated a cross-sectional view of an embodiment of the present invention incorporated within a pneumatic radial runflat tire 70. The tire 70 has a tread 72, a belt structure 74 comprising a first or inner belt 76 and a second or outer belt 78, a pair of sidewall portions 80,82, a pair of bead regions 84a,84b and a carcass structure 86. The carcass structure 86 is shown in FIG. 7 as comprising a single ply 88 and the bead regions 84a,84b. The bead regions each comprise an inextensible bead 90a,90b and a bead filler apex 92a,92b. The sidewalls 80,82 each contain a single circumferentially disposed wedge insert 50a,50b according to the saw-tooth shape of the present invention. Each single wedge insert 50a,50b is disposed axially inward of the single carcass ply 88. A fabric overlay 97 is deployed beneath, or radially inward of, tread 72 and on top of, or radially outward from, belt structure 74.

Though the carcass structure 86 shown in FIG. 7 is shown as comprising a single ply 88, the inventor acknowledges the potential benefits that could derive from the use of the present invention in conjunction with a carcass structure comprising more than one ply. For example, the carcass structure having two or more radial carcass plies could allow for the disposition of such additional runflat-benefitting structures as a circumferentially disposed, tread-stiffening wedge insert disposed translaterally between the two or more carcass ply layers in the region beneath the tread. Such a wedge insert disposed beneath the tread and between the carcass plies could contribute to the inhibition of tread lift during runflat operation in a tire incorporating the present invention.

The embodiment illustrated in FIG. 7 is that of a runflat tire design in which the reinforced sidewalls will have a low structural moment of inertial during normal inflated operation and a high structural moment of inertial during runflat operation.

Second Embodiment

Figure 8:
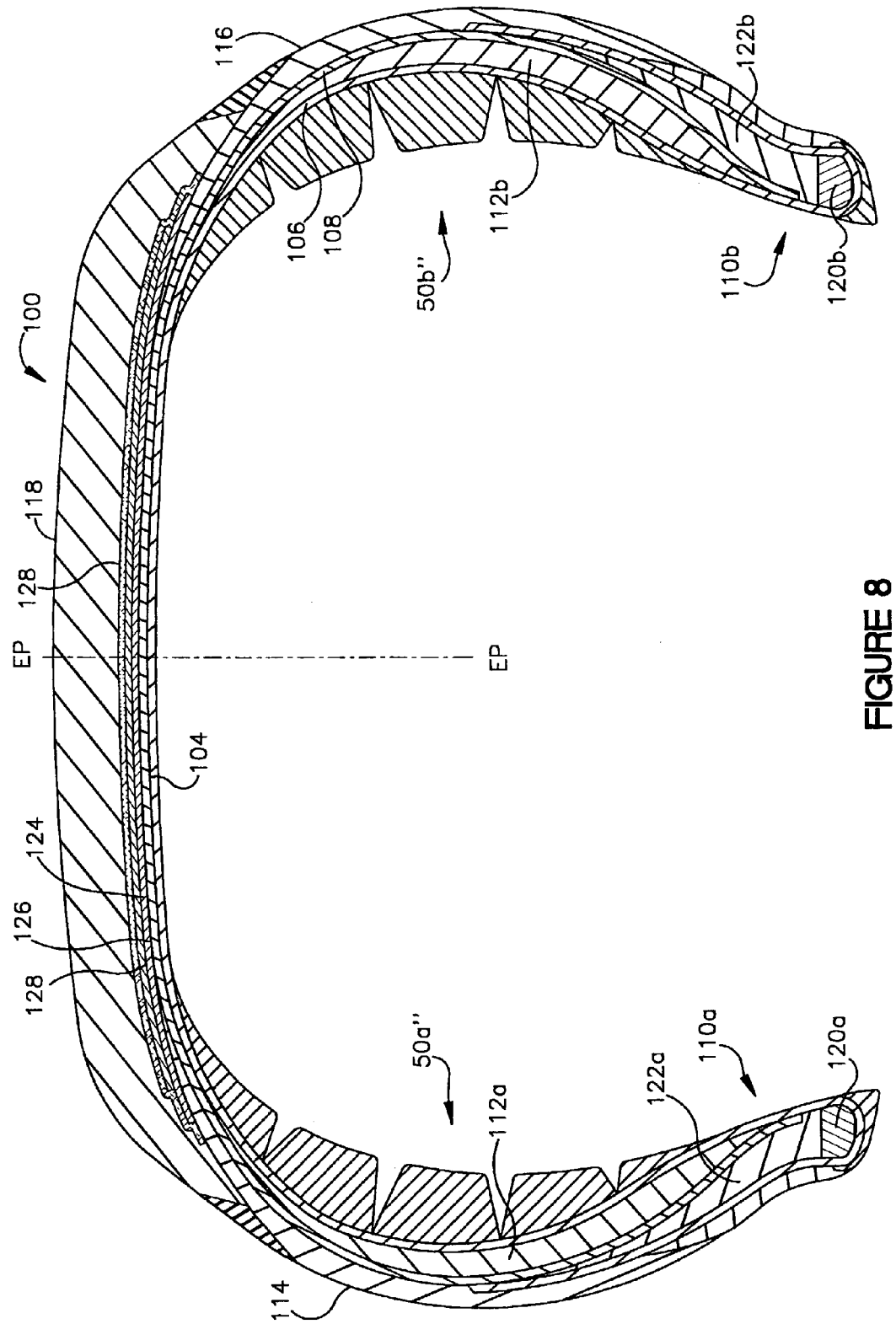
FIG. 8 is a meridional cross-sectional view of a tire with two sidewall inserts wherein one of the inserts is in accordance with the first embodiment of the present invention.

With reference to FIG. 8, there is illustrated a cross-sectional view of an embodiment of the present invention incorporated within a pneumatic radial runflat tire 100. The tire 100 has a higher aspect ratio than the tire 70, shown in FIG. 7, though the following description could be applicable to a runflat tire design of any aspect ratio. The tire 100 incorporates a pair of circumferentially disposed first wedge inserts 50a",50b" built according to saw-tooth shape of the present invention. The carcass structure 104 comprises two or more radial carcass ply layers 106,108 and bead regions 110a,110b, the latter including beads 120a,120b and bead filler apexes 122a,122b. A second pair of wedge inserts 112a,112b is disposed between the ply layers 106,108 within the sidewall portions 114,116. The tire 100 also contains such other typical radial ply tire components as a tread 118, and a belt structure 124 comprising a first belt 126 and a second belt 128. A fabric overlay 130 can be disposed radially inward of the tread 118 and radially outward of the belt structure 124.

Though the tire 100 shown in FIG. 8 is shown as having a high profile or aspect ratio, the inventor acknowledges the potential benefits that could derive from the use of the present invention in conjunction with second and even third pairs of wedge inserts within runflat tire designs having any aspect ratio as might be required to accommodate the intended service of the tire.

The embodiment illustrated in FIG. 8 is that of a runflat tire design in which the reinforced sidewalls will have a low structural moment of inertial during normal inflated operation and a high structural moment of inertial during runflat operation.

While the invention has been described in combination with embodiments thereof, it is evident that many alternatives, modifications, and variations will be apparent to those skilled in the art in light of the foregoing description and discussion. The present invention is intended to embrace all such alternatives, modifications and variations as fall within the spirit and scope of the appended claims.

What is claimed:

1. A pneumatic radial ply runflat tire having a tread, a carcass structure comprising at least one radial carcass ply, and two sidewalls comprising:

a single circumferentially-disposed wedge insert disposed on an inner surface of each sidewall, each wedge insert having a saw-tooth shaped cross-section comprising a plurality of circumferentially disposed segments each of which is separated from one another, during normal-inflated operation, by a plurality of intervening circumferential grooves;

wherein each groove is bounded by an outer surface of a given segment and an inner surface of an adjacent segment; and the outer surface of a given segment and the inner surface of an adjacent segment intersect at a hinge point P, and the segments can therefore pivot with respect to each other;

the outer surface of a given segment is convex; and the inner surface of an adjacent segment is concave;

wherein during runflat operation, when the outer surface engages the inner surface, axial deflection is substantially prevented.

2. A pneumatic radial ply runflat tire having a tread, a carcass structure comprising at least one radial carcass ply, and two sidewalls comprising:

a single circumferentially-disposed wedge insert disposed on an inner surface of each sidewall, each wedge insert having a saw-tooth shaped cross-section comprising a plurality of circumferentially disposed segments each of which is separated from one another, during normal-inflated operation, by a plurality of intervening circumferential grooves;

wherein each groove is bounded by an outer surface of a given segment and an inner surface of an adjacent segment;

the outer surface of a given segment and the inner surface of an adjacent segment intersect at a hinge point P, and the segments can therefore pivot with respect to each other; and the outer surface of a given insert and the inner surface of an adjacent insert are both non-flat surfaces.

3. The pneumatic radial ply runflat tire of claim 2 characterized in that:

an inner liner is disposed on the inner and outer surfaces of the segments.

4. The pneumatic radial ply runflat tire of claim 2 characterized in that:

an inner liner is disposed between the wedge insert and an inner ply of the tire.

5. A pneumatic radial ply runflat tire having a tread, a carcass structure comprising at least one radial carcass ply, and two sidewalls comprising:

a single circumferentially-disposed wedge insert disposed on an inner surface of each sidewall, each wedge insert having a saw-tooth shaped cross-section comprising a plurality of circumferentially disposed segments each of which is separated from one another, during normal-inflated operation, by a plurality of intervening circumferential grooves;

wherein each groove is bounded by an outer surface of a given segment and an inner surface of an adjacent segment;

the outer surface of a given segment and the inner surface of an adjacent segment intersect at a hinge point P, and the segments can therefore pivot with respect to each other; and the length of the inner and outer surfaces of the segments extend less than the thickness of the insert.

6. A pneumatic radial ply runflat tire having a tread, a carcass structure comprising at least one radial carcass ply, two sidewalls and at least one wedge insert disposed on an inner surface of each sidewall, each wedge insert comprising a plurality of circumferentially disposed segments each of which is separated from one another, during normal-inflated operation, by a plurality of intervening circumferential grooves; and each groove is bounded by an outer surface of a given segment and an inner surface of an adjacent segment; characterized in that:

at least one of the outer surface of a given insert and the inner surface of an adjacent insert is a non-flat surface.

7. The pneumatic radial ply runflat tire of claim 6, characterized in that:

the outer surfaces of selected ones of the segments are convex; and the inner surfaces of selected ones of the segments are concave.

8. The pneumatic radial ply runflat tire of claim 6, characterized in that:

the outer surface of a given segment is convex; and the inner surface of an adjacent segment is concave;

wherein during runflat operation, when the outer surface engages the inner surface, axial deflection is substantially prevented.

9. The pneumatic radial ply runflat tire of claim 6, characterized in that:

the outer surface of a given segment is concave; and the inner surface of an adjacent segment is convex;

wherein during runflat operation, when the outer surface engages the inner surface, axial deflection is substantially prevented.

10. The pneumatic radial ply runflat tire of claim 6, characterized in that:

the outer surface of a given segment and the inner surface of an adjacent segment surfaces intersect at a hinge point P, and the segments can therefore pivot with respect to each other.

11. The pneumatic radial ply runflat tire of claim 6 characterized in that the outer surface of a given insert and the inner surface of an adjacent insert engage each other during runflat operation.

12. The pneumatic radial ply runflat tire of claim 6 characterized in that:

an inner liner is disposed on the inner and outer surfaces of the segments.

13. The pneumatic radial ply runflat tire of claim 6 characterized in that:

an inner liner is disposed between the wedge insert and an inner ply of the tire.

14. The pneumatic radial ply runflat tire of claim 6, characterized in that:

the length of the inner and outer surfaces of the segments extend less than the thickness of the insert.

* * * * *